United States Patent
Koivikko et al.

(10) Patent No.: US 7,314,528 B2
(45) Date of Patent: Jan. 1, 2008

(54) CRYSTALLIZATION OF SUGARS

(75) Inventors: Hannu Koivikko, Kantvik (FI); Minna Kaarto, Helsinki (FI); Heikki Heikkilä, Espoo (FI); Mirja Lindroos, Kirkkonummi (FI); Juha Nurmi, Kirkkonummi (FI)

(73) Assignee: Danisco Sweeteners Oy, Kantvik (FI)

( * ) Notice: Subject to any disclaimer, the term of this patent is extended or adjusted under 35 U.S.C. 154(b) by 0 days.

(21) Appl. No.: 11/656,274

(22) Filed: Jan. 22, 2007

(65) Prior Publication Data

US 2007/0113840 A1 May 24, 2007

Related U.S. Application Data

(63) Continuation of application No. 10/518,893, filed as application No. PCT/FI03/000521 on Jun. 26, 2003, now abandoned.

(30) Foreign Application Priority Data

Jun. 27, 2002 (FI) .................................. 20021262

(51) Int. Cl.
C13D 3/16 (2006.01)
C13D 3/14 (2006.01)
(52) U.S. Cl. ...................... 127/55; 127/46.2; 127/46.3; 435/105; 210/638; 210/651
(58) Field of Classification Search ............... 127/46.2, 127/46.3, 55; 210/638, 651, 652, 653, 654
See application file for complete search history.

(56) References Cited

U.S. PATENT DOCUMENTS

| 5,391,299 | A | 2/1995 | Masuda et al. ............. 210/659 |
| 5,869,297 | A | 2/1999 | Binder et al. ............... 435/105 |
| 6,406,546 | B1 | 6/2002 | Donovan et al. ............. 127/55 |
| 6,436,678 | B2 | 8/2002 | Antrim et al. ................ 435/95 |
| 6,872,316 | B2 | 3/2005 | Heikkila et al. ............. 210/652 |
| 2002/0158021 | A1 | 10/2002 | Heikkia et al. ............. 210/651 |

FOREIGN PATENT DOCUMENTS

| EP | 0 452 238 | 3/1991 |
| WO | WO 02/053781 | 7/2002 |
| WO | WO 02/053782 | 7/2002 |
| WO | WO 02/053783 | 7/2002 |

OTHER PUBLICATIONS

D.L. Klug; "The Influence of Impurities and Solvents on Crystallization", Handbook of Industrial Crystallization (Butterworths monographs in chemistry), Ch. 3 p. 76 & 83 (1993).
Mikkonen, H. et al.; "Effect of Nanofiltration on Lactose Crystallization", Milchwissenschaft p. 307-310 56 (6) 2001.

*Primary Examiner*—David M Brunsman
(74) *Attorney, Agent, or Firm*—Scully, Scott, Murphy & Presser, P.C.

(57) ABSTRACT

The invention relates to removing crystallization inhibitors from a solution comprising one or more reducing sugars by nanofiltration, hydrolysis and/or chromatography. The reducing sugars are typically selected from fructose and xylose.

42 Claims, No Drawings

CRYSTALLIZATION OF SUGARS

CROSS-REFERENCE TO RELATED APPLICATIONS

This application is a continuation of U.S. Ser. No. 10/518,893 filed on Dec. 22, 2004, as a 371 application now abandoned based on PCT/FI03/000521 having an international filing date of Jun. 26, 2003.

BACKGROUND OF THE INVENTION

The invention relates to the crystallization of sugars and especially to the treatment of sugar solutions for crystallization with the aim to purify sugar solutions from crystallization inhibitors. In connection with the present invention, the sugars are especially reducing sugars.

In the sugar industry, crystalline sugar products are especially desirable end products. The crystallization of sugars, however, is in many cases difficult due to the presence of so-called crystallization inhibitors. The crystallization inhibitors comprise various by-products formed in sugar solutions in the sugar-processing steps preceding the crystallization, such as during the hydrolysis of the raw material, during the sugar-inversion stage and during the concentration and/or evaporation stages relating to the recovery of the desired sugars.

It is generally known in the art of sugar crystallization that crystallization inhibitors disturb the crystallization of sugars by adhering to the growing sugar crystal in the crystal growth stage by covering part of the sugar crystal surface by crystallization inhibitors. The presence of crystallization inhibitors retards the crystallization process and leads to distortions in the crystal shape.

Xylose, fructose and maltose are examples of reducing sugars where the presence of crystallization inhibitors should be avoided in the crystallization stage.

Fructose is a valuable raw material in the sweets, aroma and flavoring industries. Fructose is generally prepared using starch or saccharose as the raw material.

A typical process for preparing fructose comprises hydrolysis/isomerisation of the starch/saccharose raw material to obtain a glucose/fructose syrup, separation of fructose from the glucose/fructose syrup for example by chromatography, concentration of the fructose fraction thus obtained, pH adjustment and crystallization. During these process steps, especially during the concentration step, some dimeric and oligomeric fructose is formed and also some disaccharides are remained in the fructose solution to be crystallized. The dimeric and oligomeric fructose forms disturb the crystallization of fructose.

It is known that fructose undergoes irreversible dehydration during the crystallization process to yield several forms of difructose dianhydride impurities (Handbook of Industrial Crystallization, Chapter 3: The Influence of Impurities and Solvents on Crystallization, p. 83, ed. Allan S. Myerson, Butterworth-Heinemann, Boston 1993). Since the difructose dianhydride molecule consists of two fructose moieties, it exhibits some of the chemical and structural features of the host fructose molecule. The difructose dianhydride impurities appear to incorporate into the crystal (at <1 weight-% level), thus inhibiting the subsequent adsorption and growth of fructose molecules. The resulting fructose crystal growth rates are so low that the crystallization time in fructose manufacture is often on the order of days.

Xylose is also a valuable raw material in the sweets, aroma and flavoring industries and particularly as a starting material in the production of xylitol. Xylose is formed in the hydrolysis of xylan-containing hemicellulose, for instance in sulphite pulping processes. Vegetable material rich in xylan include the wood material from various wood species, particularly hardwood, such as birch, aspen and beech, various parts of grain (such as straw and husks, particularly corn and barley husks and corn cobs and corn fibers), bagasse, coconut shells, cottonseed skins etc.

Crystallization of xylose is carried out from xylose-containing solutions of various origin and purity, for instance from sulphite pulping liquors. In addition to xylose, the spent sulphite pulping liquors contain, as typical components, lignosulphonates, sulphite cooking chemicals, xylonic acid, oligomeric sugars, dimeric sugars and monosaccharides (other than the desired xylose), and carboxylic acids, such as acetic acid, and uronic acids.

Before crystallization, it is as a rule necessary to purify the xylose-containing solution obtained as a result of the hydrolysis of cellulosic material to a required degree of purity by various methods, such as filtration to remove mechanical impurities, ultrafiltration, ion-exchange, decolouring, ion exclusion or chromatography or combinations thereof.

Xylose is produced in large amounts in pulp industry, for example in the sulphite cooking of hardwood raw material. Separation of xylose from such cooking liquors is described, for example, in U.S. Pat. No. 4,631,129 (Suomen Sokeri Oy). In this process, sulphite spent liquor is subjected to two-step chromatographic separation to form substantially purified fractions of sugars (e.g. xylose) and lignosulphonates. The first chromatographic fractionation is carried out using a resin in a divalent metal salt form, typically in a calcium salt form, and the second chromatographic fractionation is carried out using a resin in a monovalent metal salt form, such as a sodium salt form.

U.S. Pat. No. 5,637,225 (Xyrofin Oy) discloses a method for the fractionation of sulphite cooking liquor by a chromatographic simulated moving bed system comprising at least two chromatographic sectional packing material beds, where at least one fraction enriched with monosaccharides and one fraction enriched with lignosulphonates is obtained. The material in the sectional packing material beds is typically a strongly acid cation exchange resin in $Ca^{2+}$ form.

U.S. Pat. No. 5,730,877 (Xyrofin Oy) discloses a method for fractionating a solution, such as a sulphite cooking liquor, by a chromatographic separation method using a system comprising at least two chromatographic sectional packing beds in different ionic forms. The material of the sectional packing bed of the first loop of the process is essentially in a divalent cation form, such as in $Ca^{2+}$ form, and in the last loop essentially in a monovalent cation form, such as in $Na^+$ form.

WO 96/27028 (Xyrofin Oy) discloses a method for the recovery of xylose by crystallization and/or precipitation from solutions having a comparatively low xylose purity, typically 30 to 60% by weight of xylose on dissolved dry solids. The xylose solution to be treated may be, for example, a concentrate chromatographically obtained from a sulphite pulping liquor.

It is also known to use membrane techniques, such as ultrafiltration to purify spent sulphite pulping liquors (e.g. Papermaking Science and Technology, Book 3: Forest Products Chemistry, p. 86, ed. Johan Gullichsen, Hannu Paulapuro and Per Stenius, Helsinki University of Technology, published in cooperation with the Finnish Paper Engineer's Association and TAPPI, Gummerus, Jyväskylä, Finland, 2000). High-molar-mass lignosulphonates can thus be separated by ultrafiltration from the low-molar-mass components, such as xylose.

It is thus known to use ultrafiltration to separate compounds having a large molar mass, such as lignosulphonates present in a sulphite spent liquor, from compounds having a small molar mass, such as xylose, whereby compounds having a large molar mass (lignosulphonates) are separated into the retentate and compounds having a small molar mass (xylose) are enriched into the permeate. Further enriching of xylose from e.g. salts is possible for example with chromatographic methods using ion exclusion.

As a final step in the recovery of xylose, xylose is then crystallized from the xylose-rich fraction obtained in the xylose separation processes described above.

Nanofiltration is a relatively new pressure-driven membrane filtration process, falling between reverse osmosis and ultrafiltration. Nanofiltration typically retains organic molecules with a molar mass greater than 300 g/mol. The most important nanofiltration membranes are composite membranes made by interfacial polymerisation. Polyether sulfone membranes, sulfonated polyether sulfone membranes, polyester membranes, polysulfone membranes, aromatic polyamide membranes, polyvinyl alcohol membranes and polypiperazine membranes are examples of widely used nanofiltration membranes. Inorganic and ceramic membranes can also be used for nanofiltration.

It is known to use nanofiltration for separating monosaccharides, such as glucose from disaccharides and higher saccharides. The starting mixture including monosaccharides, disaccharides and higher saccharides may be a starch hydrolysate, for example.

U.S. Pat. No. 5,869,297 (Archer Daniels Midland Co.) discloses a nanofiltration process for making dextrose. This process comprises nanofiltering a dextrose composition including as impurities higher saccharides, such as disaccharides and trisaccharides. A dextrose composition having a solids content of at least 99% dextrose is obtained. Crosslinked aromatic polyamide membranes have been used as nanofiltration membranes.

WO 99/28490 (Novo Nordisk AS) discloses a method for enzymatic reaction of saccharides and for nanofiltration of the enzymatically treated saccharide solution including monosaccharides, disaccharides, trisaccharides and higher saccharides. Monosaccharides are obtained in the permeate, while an oligosaccharide syrup containing disaccharides and higher saccharides is obtained in the retentate. The retentate including the disaccharides and higher saccharides is recovered. A thin film composite polysulfone membrane having a cut-off size less than 100 g/mol has been used as the nanofiltration membrane, for example.

U.S. Pat. No. 4,511,654 (UOP Inc.) relates to a process for the production of a high glucose or maltose syrup by treating a glucose/maltose-containing feedstock with an enzyme selected from amyloglucosidase and β-amylase to form a partially hydrolyzed reaction mixture, passing the resultant partially hydrolyzed reaction mixture through an ultrafiltration membrane to form a retentate and a permeate, recycling the retentate to the enzyme treatment stage, and recovering the permeate including the high glucose or maltose syrup.

U.S. Pat. No. 6,126,754 (Roquette Freres) relates to a process for the manufacture of a starch hydrolysate with a high dextrose content. In this process, a starch milk is subjected to enzymatic treatment to obtain a raw saccharified hydrolysate. The hydrolysate thus obtained is then subjected to nanofiltering to collect as the nanofiltration permeate the desired starch hydrolysate with a high dextrose content.

Maltose is a valuable raw material in the production of maltitol (α(1→4)glucosylsorbitol), which is a sugar alcohol generally used as a sweetening agent in low-caloric, dietary and low-cariogenic foods, such as confectionary products and chewing gums. Maltitol is prepared in the form of crystalline maltitol or maltitol syrup.

Maltose is produced from a starch solution, which is first enzymatically hydrolyzed into a maltose syrup. For the production of maltitol, maltose syrup is catalytically hydrogenated to maltitol, whereafter the maltitol syrup is crystallized. The maltose syrup used as the starting material for the hydrogenation and crystallization contains varying levels of undesirable impurities, especially maltotriose. Maltotriose has a tendency to make the final maltose product unstable and hygroscopic. Maltotriose may also disturb the crystallization of maltose and maltitol. Furthermore, in the hydrogenation of maltose to maltitol, maltoriose is hydrogenated to maltotritol. Maltotritol also disturbs the crystallization of maltitol. For preparing crystalline products of high purity, it is thus necessary to purify the maltose-containing syrup from maltotriose. Various methods, such as hydrolysis with enzymes, chromatography and ultrafiltration or combinations thereof have been used for the purification of maltose syrups.

An enzymatic hydrolysis method for the production of maltose has been disclosed e.g. in U.S. Pat. No. 4,408,041 (Hayashibara). Chromatographic methods for the purification of maltose have been disclosed in U.S. Pat. No. 3,817,787 (Suomen Sokeri Oy) and U.S. Pat. No. 4,487,198 (Hayashibara), for example.

U.S. Pat. No. 3,832,285 (Hayashibara) relates to a method of producing maltose with high purity using enzymatic treatment and dialysis. U.S. Pat. No. 6,346,400 B1 (Roquette Freres) relates to a process for the preparation of a maltose-rich syrup using a sequence of enzymatic treatment, molecular sieve treatment and enzymatic treatment.

Ultrafiltration for the purification of liquors containing maltose and glucose have been described e.g. in U.S. Pat. No. 4,429,122 (UOP Inc.). This U.S. Patent discloses a process for the separation of a mono- or disaccharide, such as glucose and/or maltose, from polysaccharides by passing a mixture containing monosaccharides, disaccharides and polysaccharides through an ultrafiltration membrane. Polysaccharides are retained on the ultrafiltration membrane, while monosaccharides and disaccharides are permeated through the membrane. In this process, maltose and/or glucose are separated from oligosaccharides, but not from impurities having a smaller molar mass, such as maltotriose.

U.S. Pat. No. 4,511,654 (UOP Inc.) relates to a process for the production of a high glucose or maltose syrup by treating a glucose/maltose-containing feedstock with an enzyme selected from amyloglucosidase and β-amylase to form a partially hydrolyzed reaction mixture, passing the resultant partially hydrolyzed reaction mixture through an ultrafiltration membrane to form a retentate and a permeate, recycling the retentate to the enzyme treatment stage, and recovering the permeate including the high glucose or maltose syrup. Even in this process, the resulting glucose/maltose syrup is not free from impurities, such as maltotriose.

Japanese Patent Publication JP 51098346 A (Ajinomoto K K) discloses the preparation of high purity maltose by reacting gelatinized starch with β-amylase and ultrafiltering the solution thus obtained using a semipermeable membrane having a cut-off size of 5000 to 50000 g/mol, preferably 10000 to 30000 g/mol. A highly pure maltose is obtained as the filtrate.

U.S. Pat. No. 6,344,591 B2 (Roquette Freres) relates to modified maltitol crystals and a process for their manufacture. The process comprises liquefaction of a starch slurry, saccharification of the slurry to obtain a maltose hydrolysate, filtration and demineralization of the maltose hydrolysate and hydrogenation of the maltose hydrolysate to obtain a maltitol syrup having a maltitol content greater than or equal to 87% and a maltotriitol content lower than 1% by weight. The process may comprise a molecular-sieving stage using nanofiltration.

It is also known in the art that raffinose has an inhibiting effect on the crystallization of saccharose (Handbook of Industrial Crystallization, Chapter 3: The Influence of Impurities and Solvents on Crystallization, p. 76, ed. Allan S. Myerson, Butterworth-Heinemann, Boston 1993). The crystallization of sucrose in the presence of raffinose has also been studied in Advances in Industrial Crystallization, ed. J. Garside, R. J. Davey & A. G. Jones, The Control of Crystal Morphology by Additives: Molecular Recognition, Kinetics and Technology, p. 153, Butterworth-Heinemann, Oxford 1991).

Methods of removing raffinose from saccharose solutions have been disclosed for example in U.S. Pat. No. 3,992,260 (Agency Ind. Science Techn.). In the processes described in this reference, raffinose is hydrolyzed by means of enzymes to saccharose and galactose. Other processes for removing raffinose have been disclosed for example in U.S. Pat. No. 3,767,526 and CS 194667 (Agency Ind. Science Techn.).

U.S. Pat. No. 5,061,625 (Boehringer Mannheim Gmbh) discloses the use of microorganisms (which form α-galactosidase but not invertase) for the hydrolysis of raffinose in connection with the crystallization of saccharose. U.S. Pat. Nos. 3,836,432, 4,036,694 and 3,664,927 (Hokkaido Sugar Co.) disclose methods and an apparatus for the hydrolysis of raffinose by enzymes (α-galactosidase). Hydrolysis of raffinose by α-galactosidase has also been disclosed in U.S. Pat. No. 4,376,167 (Eni Ente Naz. Idrocarb.)

U.S. Pat. Nos. 4,333,779 and 4,312,678 (UOP Inc.) disclose the separation of crystallization inhibitors, such as glucose, fructose and raffinose from saccharose by adsorbing saccharose to an adsorbent followed by desorbtion.

Enzymatic hydrolysis in connection with xylan has been studied for example by P. Biely in the article "Microbial xylanolytic systems" in Trends in Biotechnology, vol. 3, No. 11, 1995.

However, the use of nanofiltration, enzymatic hydrolysis and/or chromatography for removing crystallization inhibitors from sugar solutions comprising reducing sugars, especially monosaccharides, has not been disclosed or suggested in the state of the art.

BRIEF SUMMARY OF THE INVENTION

The purpose of the present invention is to provide a method of removing crystallization inhibitors from a sugar solution, especially a solution comprising reducing sugars and/or corresponding sugar alcohols thereof. The process of the claimed invention is based on the use of a purification step selected from nanofiltration, chromatography and/or hydrolysis.

A more detailed explanation of the invention is provided in the following description and appended claims.

DEFINITIONS RELATING TO THE INVENTION

In connection with the present invention, the term "reducing sugar" refers to a sugar that reduces Fehling's solution. In a typical embodiment of the invention, the term "reducing sugar" refers to a sugar that contains a free aldehyde or a free keto group, i.e. an aldose or a ketose sugar. In a preferred embodiment of the invention, the reducing sugars are monosaccharides. Typical examples of reducing sugars in connection with the present invention are xylose, fructose and maltose.

The term "crystallization inhibitor" refers to compounds which have an inhibiting effect on the crystallization of reducing sugars by adhering to the sugar crystal surface in the crystal growth stage. In connection with the present invention, the crystallization inhibitors are typically selected from compounds, which have a larger molar mass than said reducing sugar or the corresponding sugar alcohol thereof. Said crystallization inhibitors are especially selected from compounds, which in their molecule include at least one monosaccharide or corresponding unit more than said reducing sugar or the corresponding sugar alcohol thereof. Said crystallization inhibitors are typically selected from dimeric and/or oligomeric compounds, especially dimeric and/or oligomeric forms of said reducing sugar and/or corresponding sugar alcohol thereof.

DETAILED DESCRIPTION OF THE INVENTION

A detailed description of preferred embodiments of the invention will now be explained.

The invention relates to a process of removing crystallization inhibitors from a solution comprising one or more reducing sugars and/or corresponding sugar alcohols thereof. The process of the invention is characterized by subjecting said solution to one or more purification steps selected from nanofiltration, chromatography and hydrolysis.

Said reducing sugars are especially selected from monosaccharides, such as xylose and fructose. The reducing sugar may also be selected from disaccharides, such as maltose. The corresponding sugar alcohol may be xylitol and maltitol, for example.

Said crystallization inhibitors are typically selected from compounds which have a larger molar mass than said reducing sugar or the corresponding sugar alcohol thereof. Said crystallization inhibitors are especially selected from compounds which in their molecule include at least one monosaccharide or corresponding unit more than said reducing sugar or the corresponding sugar alcohol thereof.

Especially, said crystallization inhibitors are selected from dimeric and/or oligomeric compounds, typically dimeric and/or oligomeric forms of said reducing sugar, such as dimeric and oligomeric forms of xylose and fructose.

In the crystallization of xylose, said crystallization inhibitors are especially selected from xylobiose, xylotriose and xylo-oligosaccharides.

In the crystallization of fructose, said crystallization inhibitors are especially selected from difructose anhydrides and fructose dianhydrides, diheterolevosanes and diheterolevulosans.

In the crystallization of maltose, said crystallization inhibitors are especially selected from maltotriose and maltotetraose.

In a preferred embodiment of the invention, nanofiltration is used as the purification step to remove crystallization inhibitors.

In the nanofiltration operation, a solution comprising said reducing sugar is typically recovered in the nanofiltration permeate and a solution comprising said crystallization inhibitors are recovered in the nanofiltration retentate.

Before the nanofiltration step, the process may also comprise one or more pretreatment steps. The pretreatment before the nanofiltration is typically selected from ion exchange, ultrafiltration, chromatography, concentration, pH adjustment, filtration, microfiltration, dilution and combinations thereof. Before the nanofiltration, the starting liquor may thus be preferably pretreated by ultrafiltration or chromatography, for example. Furthermore, a prefiltering step to remove the solid substances can be used before the nanofiltration. The pretreatment of the starting liquor may also comprise concentration, e.g. by evaporation, or neutralization. The pretreatment may also comprise crystallization, whereby the starting liquor may also be a mother liquor obtained from the crystallization of xylose, fructose or maltose, for example.

The nanofiltration is typically carried out at a pH of 1 to 7, preferably 3 to 6.5, most preferably 5 to 6.5. The pH depends on the composition of the starting material, such as biomass hydrolysate and the membrane used for the nanofiltration and the stability of sugars or components to be recovered. If necessary, the pH of the starting biomass hydrolysate, such as that of a spent liquor from a pulping process is adjusted to the desired value before nanofiltration using preferably the same reagent as in the pulping stage, such as $Ca(OH)_2$ or MgO, for example.

The nanofiltration is typically carried out at a pressure of 10 to 50 bar, preferably 15 to 40 bar. A typical nanofiltration temperature is 5 to 95° C., preferably 30 to 60° C. The nanofiltration is typically carried out with a flux of 5 to 100 $l/m^2h$.

The nanofiltration membrane used in the present invention can be selected from polymeric and inorganic membranes having a cut-off size of 100-2500 g/mol, preferably 150 to 1000 g/mol, most preferably 150 to 500 g/mol.

Typical polymeric nanofiltration membranes useful in the present invention include, for example, polyether sulfone membranes, sulfonated polyether sulfone membranes, polyester membranes, polysulfone membranes, aromatic polyamide membranes, polyvinyl alcohol membranes and polypiperazine membranes and combinations thereof. Cellulose acetate membranes are also useful as nanofiltration membranes in the present invention.

Typical inorganic membranes include $ZrO_2$- and $Al_2O_3$-membranes, for example.

Preferred nanofiltration membranes are selected from sulfonated polysulfone membranes and polypiperazine membranes. For example, specific useful membranes are: Desal-5 DK, Desal-5 DL and Desal G10 nanofiltration membrane (manufacturer Osmonics), NF-200 nanofiltration membrane (manufacturer Dow Deutschland) and NTR 7450 nanofiltration membrane, for example.

The nanofiltration membranes which are useful in the present invention may have a negative or positive charge. The membranes may be ionic membranes, i.e. they may contain cationic or anionic groups, but even neutral membranes are useful. The nanofiltration membranes may be selected from hydrophobic and hydrophilic membranes.

One form of nanofiltration membranes is a flat sheet form. The membrane configuration may also be selected e.g. from tubes, spiral membranes and hollow fibers. "High shear" membranes, such as vibrating membranes and rotating membranes can also be used.

Before the nanofiltration procedure, the nanofiltration membranes may be pretreated with alkaline detergents or ethanol, for example.

In a typical nanofiltration operation, the liquor to be treated, such as a xylose fraction obtained from chromatographic separation of xylose or a fructose fraction obtained from the chromatographic separation of fructose is nanofiltered using the nanofiltration membranes and the temperature and pressure conditions described above. The liquor is thus fractionated into a low molar mass fraction including xylose or fructose (permeate) and a high molar mass fraction including the non-desired crystallization inhibitors (retentate). The liquor to be treated may also be a mother liquor from xylose or fructose crystallization.

The nanofiltration equipment useful in the present invention comprises at least one nanofiltration membrane element dividing the feed into a retentate and permeate section. The nanofiltration equipment typically also include means for controlling the pressure and flow, such as pumps and valves and flow and pressure meters and controllers. The equipment may also include several nanofiltration membrane elements in different combinations, arranged in parallel or series.

The flux of the permeate varies in accordance with the pressure. In general, at a normal operation range, the higher the pressure, the higher the flux. The flux also varies with the temperature. An increase of the operating temperature increases the flux. However, with higher temperatures and with higher pressures there is an increased tendency for a membrane rupture. For inorganic membranes, higher temperatures and pressures and higher pH ranges can be used than for polymeric membranes.

The nanofiltration in accordance with the present invention can be carried out batchwise or continuously. The nanofiltration procedure can be repeated once or several times. Recycling of the permeate and/or the retentate back to the feed vessel can also be used.

After nanofiltration, said reducing sugar is subjected to crystallization. In a preferred embodiment of the invention, the nanofiltered solution is used as such for the crystallization, without further purification and separation steps. If desired, the nanofiltered sugar-containing liquor can be subjected pH adjustment or further purification, e.g. by chromatography, ion exchange, concentration e.g. by evaporation or reverse osmosis, or colour removal.

In another embodiment of the invention, said purification step to remove the crystallization inhibitors is selected from hydrolysis. The hydrolysis may be carried out as enzymatic hydrolysis or acid hydrolysis. The enzymatic hydrolysis may be carried out with the β-glucosidase, β-xylosidase, β-amylase or α-amylase enzyme, for example.

In a further embodiment of the process, the purification step for removing crystallization inhibitors may be selected from chromatographic separation.

The chromatographic separation may be carried out with cation exchange resins or anion exchange resins. The cation exchange resins may be selected from strongly acid cation exchange resins and weakly acid cation exchange resins. Said resin may be in a monovalent metal form or divalent metal form. The monovalent metal may be selected from $Na^+$ and $K^+$. The divalent metal may be selected from $Ca^{2+}$, $Mg^{2+}$ and $Sr^{2+}$. The resin has typically a styrene or acrylic skeleton, which is preferably cross-linked with divinylbenzene.

Said solution comprising one or more reducing sugars and/or corresponding sugar alcohols thereof used as starting material in the process of the present invention may be a fraction enriched in said reducing sugar and/or sugar alcohol and obtained from the separation of said reducing sugar and/or sugar alcohol. The separation may comprise chromatographic separation, for example.

Said solution comprising one or more reducing sugars and/or sugar alcohols thereof may also be a mother liquor obtained from the crystallization of said reducing sugar and/or sugar alcohol.

The starting material may be a xylose-containing fraction or a fructose-containing fraction obtained from the chromatographic separation of xylose or fructose. The starting material may also be a mother liquor obtained from the crystallization of said reducing sugar, such as a mother liquor obtained from the crystallization of xylose or fructose.

In one preferred embodiment of the invention, the invention relates to removing crystallization inhibitors of fructose from fructose solutions using nanofiltration. The crystallization inhibitors of fructose are typically dimeric and/or oligomeric forms of fructose, such as difructose anhydrides, fructose dianhydrides, diheterolevosanes and diheterolevulosans.

Fructose is typically obtained by subjecting starch/saccharose to hydrolysis/isomerization to obtain a glucose/fructose syrup. Fructose is separated from the glucose/fructose syrup, for example by chromatography. The fructose fraction obtained from chromatography is concentrated, for example by evaporation. The concentrated fructose syrup typically includes dimeric and oligomeric forms of fructose, which inhibit the crystallization of fructose.

In addition to the fructose syrup obtained from the fructose production, the starting material in the process of the present invention may also be a mother liquor obtained from the crystallization of fructose.

In the purification of fructose from crystallization inhibitors, said purification step is preferably carried out using nanofiltration membranes and nanofiltration conditions mentioned above. Especially preferred nanofiltration membranes for fructose are selected from Desal-5 DL and Desal-5 DK nanofiltration membranes. In one preferred embodiment of the invention, the nanofiltration is carried out with a flux of 0.5 to 3 kg fructose/m$^2$/h, the nanofiltration temperature is 40 to 60° C., the nanofiltration pressure 30 to 40 bar and the concentration of the nanofiltration syrup 20 to 50%.

In another preferred embodiment of the invention, the invention relates to removing crystallization inhibitors of xylose from xylose solutions by nanofiltration. Typical xylose crystallization inhibitors are xylobiose, xylotriose and xylo-oligosaccharides, for example;

In the crystallization of xylose, the starting xylose solution is typically a xylose fraction obtained from the chromatographic separation of xylose from a biomass hydrolysate, such as a sulphite pulping liquor. Furthermore, the xylose fraction thus obtained has been as a rule concentrated, for example by evaporation. In the concentration step, some dimeric and/or oligomeric xylose may be formed in the xylose solution. Said dimeric/oligomeric forms of xylose disturb the crystallization of xylose.

The biomass hydrolysate useful as starting material in the production of xylose in accordance with the present invention may be obtained from the hydrolysis of any biomass, typically xylan-containing vegetable material. The biomass hydrolysate can be obtained from the direct acid hydrolysis of biomass, from enzymatic or acid hydrolysis of a prehydrolysate obtained from biomass by prehydrolysis (with steam or acetic acid, for instance), and from sulphite pulping processes. Xylan-containing vegetable material include wood material from various wood species, particularly hardwood, such as birch, aspen and beech, various parts of grain (such as straw and husks, particularly corn and barley husks and corn cobs and corn fibers), bagasse, coconut shells, cottonseed skins etc.

The biomass hydrolysate used as starting material in the process of the invention may be also a part of a biomass hydrolysate obtained from hydrolysis of biomass-based material. Said part of a biomass hydrolysate may be a prepurified hydrolysate obtained e.g. by ultrafiltration or chromatography.

The biomass hydrolysate used for the recovery of xylose in accordance with the present invention is typically a spent liquor obtained from a pulping process. A typical spent liquor useful in the present invention is a xylose-containing spent sulphite pulping liquor, which is preferably obtained from acid sulphite pulping. The spent liquor may be obtained directly from sulphite pulping. It may also be a concentrated sulphite pulping liquor or a side-relief obtained from sulphite cooking. It may also be a xylose-containing fraction chromatographically obtained from a sulphite pulping liquor or a permeate obtained by ultrafiltration of a sulphite pulping liquor. Furthermore, a post-hydrolyzed spent liquor obtained from neutral cooking is suitable.

The spent liquor is preferably obtained from hardwood pulping. A spent liquor obtained from softwood pulping is also suitable, preferably after hexoses have been removed e.g. by fermentation. The spent liquor may also be any other liquor obtained from the digestion or hydrolysis of biomass, typically cellulosic material with an acid. Such a hydrolysate can be obtained from cellulosic material for example by treatment with an inorganic acid, such as hydrochloric acid, sulphuric acid or sulphur dioxide, or by treatment with an organic acid, such as formic acid or acetic acid. A spent liquor obtained from a solvent-based pulping, such as ethanol-based pulping may also be used.

The biomass hydrolysate used as starting material may have been subjected to one or more pretreatment steps. The pretreatment steps are typically selected from ion exchange, ultrafiltration, chromatography, concentration, pH adjustment, filtration, dilution, crystallization an combinations thereof.

The spent hardwood sulphite pulping liquor also contains other monosaccharides in a typical amount of 10 to 30%, based on the xylose content. Said other monosaccharides include e.g. glucose, galactose, rhamnose, arabinose and mannose. Xylose and arabinose are pentose sugars, whereas glucose, galactose, rhamnose and mannose are hexose sugars. Furthermore, the spent hardwood sulphite pulping liquor typically includes rests of pulping chemicals and reaction products of the pulping chemicals, lignosulphonates, oligosaccharides, disaccharides, xylonic acid, uronic acids, metal cations, such as calcium and magnesium cations, and sulphate and sulphite ions. The biomass hydrolysate used as starting material also contains rests of acids used for the hydrolysis of the biomass.

The dry substance content of the starting biomass hydrolysate, such as that of the spent liquor is typically 3 to 50% by weight, preferably 8 to 25% by weight.

The dry substance content of the starting biomass hydrolysate used as the nanofiltration feed is preferably less than 35% by weight, typically 25 to 30% by weight.

The xylose content of the starting biomass hydrolysate may be 5 to 95%, preferably 15 to 55%, more preferably 15 to 40% and especially 8 to 27% by weight, based on the dry substance content.

The xylose content of the spent liquor to be treated is typically 10 to 40% by weight, based on the dry substance content. A spent liquor obtained directly from hardwood sulphite pulping has a typical xylose content of 10 to 20%, based on the dry substance content.

The nanofiltration conditions and nanofiltration membranes useful for removing xylose crystallization inhibitors from xylose solutions have been described above.

In a further embodiment of the invention, the invention also relates to removing crystallization inhibitors of maltose from maltose solutions.

When preparing crystalline maltose, the maltose-containing liquor used as starting material may be a maltose syrup, for example. The dry substance content of the maltose-containing liquor is typically 5 to 50% by weight, preferably 8 to 25% by weight.

The maltose-containing liquor used as starting material usually contains also monosaccharides, mainly glucose, in a typical amount of 10 to 95%, based on the maltose content. The starting liquor may also contain minor amounts of other monosaccharides. Furthermore, the starting maltose-containing liquor typically contains oligosaccharides and small amounts of ionic compounds, such as metal cations, e.g. sodium, potassium, calcium, magnesium and iron cations.

The maltose-containing liquor to be treated is typically obtained from a starch solution, which is typically hydrolyzed into a maltose syrup. The hydrolysis can be carried out with enzymes, for example.

The nanofiltration conditions and nanofiltration membranes useful for removing maltose crystallization inhibitors from maltose solutions have been described above.

The crystallization step in accordance with the present invention may be carried out by any conventional crystallization methods, such as boiling crystallization, cooling crystallization and precipitation crystallization, or a combination thereof. Seeding may be used, if desired. The crystallization is preferably carried out in water, but an alcohol, such as ethanol, or a mixture of water and alcohol can also be used. The crystals are collected for instance by centrifugation or filtering.

Preferred embodiments of the invention will be described in greater detail by the following examples, which are not construed as limiting the scope of the invention.

In the examples and throughout the specification and claims, the following definitions have been used:

DS refers to the dry substance content measured by Karl Fischer titration, expressed as % by weight.

RDS refers to the refractometric dry substance content, expressed as % by weight.

Flux refers to the amount (liters) of the solution that permeates through the nanofiltration membrane during one hour calculated per one square meter of the membrane surface, $l/(m^2h)$.

Retention refers to the proportion of the measured compound retained by the membrane. The higher the retention value, the less is the amount of the compound transferred through the membrane:

Retention(%)=[(Feed−Permeate)/Feed]×100, where "Feed" refers to the concentration of the compound in the feed solution (expressed e.g. in g/l) and "Permeate" refers to the concentration of the compound in the permeate solution (expressed e.g. in g/l).

HPLC (for the determination of carbohydrates) refers to liquid chromatography. The carbohydrates of the fructose and maltose solutions/samples were analyzed by HPLC with $Na^+$ form ion exchange column and RI detection. Also disaccharides and oligosaccharides of the samples containing xylose as a main monosaccharide were analyzed with $Na^+$ form column. The samples that contained xylose as a main monosaccharide were analysed for monosaccharides by HPLC with $Pb^{2+}$ form ion exchange column and RI detection. Xylobiose, xylotriose and xylonic acid were analysed by HPLC with anion exchange column and PED detection.

Colour (where determined) was measured by an adapted ICUMSA method at pH 5.

The following membranes are useful in the nanofiltration process of the present invention:

Desal-5 DK (a four-layered membrane consisting of a polyester layer, a polysulfone layer and two proprietary layers, having a cut-off size of 150 to 300 g/mol, permeability (25° C.) of 5.4 $l/(m^2 bar)$ and $MgSO_4$-retention of 98% (2 g/l), manufacturer Osmonics), Desal-5 DL (a four-layered membrane consisting of a polyester layer, a polysulfone layer and two proprietary layers, having a cut-off size of 150 to 300 g/mol, permeability (25° C.) of 7.6 $l/(m^2 bar)$, $MgSO_4$-retention of 96% (2 g/l), manufacturer Osmonics), NTR-7450 (a sulfonated polyethersulfone membrane having a cut-off size of 500 to 1000 g/mol, permeability (25° C.) of 9.4 $l/(m^2h bar)$, NaCl-retention of 51% (5 g/l), manufacturer Nitto Denko), and NF-200 (a polypiperazine membrane having a cut-off size of 200 g/mol, permeability (25° C.) of 7-8 $l/(m^2h bar)$, NaCl-retention of 70%, manufacturer Dow Deutschland), TS-80 (manufacturer Trisep), ATF-60 (manufacturer PTI Advanced Filtration Inc.), Desal AG (manufacturer Osmonics), Desal G10 (a thin film membrane of aromatic polyamide/polysulfone material having a cut-off-size of 2500 g/mol, permeability (25° C.) of 3.4 $l/(m^2h bar)$, NaCl-retention of 10%, retention of dextrane (1500 g/ml) of 95%, retention of glucose of 50%, manufacturer Osmonics), ASP 10 (a membrane consisting of sulfonated polysulfone on polysulfone, having a permeability (25° C.) of 16 $l/(m^2h bar)$, NaCl-retention of 10%, manufacturer Advanced Membrane Technology), TS 40 (a membrane consisting of fully aromatic polyamide, having a permeability (25° C.) of 5.6 $l/(m^2h bar)$, manufacturer TriSep), ASP 20 (a membrane consisting of sulfonated polysulfone on polysulfone, having a permeability (25° C.) of 12.5 $l/(m^2h bar)$, NaCl-retention of 20%, manufacturer Advanced Membrane Technology), UF-PES-4H (a membrane consisting of polyethersulfone on polypropylene, having a cut-off size of about 4000 g/mol, a permeability (25° C.) of 7 to 17 $l/(m^2h bar)$, manufacturer Hoechst), NF-PES-10 (a polyethersulfone membrane, having a cut-off size of 1000 g/mol, a permeability (25° C.) of 5 to 11 $l/(m^2h bar)$, NaCl-retention less than 15% (5 g/l), manufacturer Hoechst), NF45 (a membrane consisting of aromatic polyamide, having a permeability (25° C.) of 4.8 $l/(m^2h bar)$, NaCl-retention of 45%, manufacturer Dow Deutschland), SR-1 (manufacturer Koch), XN-40 (manufacturer Trisep), MPF-34 (a composite membrane having a cut-off size of 200 g/mol and a glucose retention of 95% for a 5% glucose solution, manufacturer Koch).

EXAMPLE 1

Nanofiltration of a Spent Sulphite Pulping Liquor to Purify Xylose from Xylose Crystallization Inhibitors The liquor to be treated was a Mg-based sulphite spent pulping liquor obtained from beechwood pulping. The spent liquor had been pretreated by ultrafiltration. The nanofiltration was carried out at a pressure of 30 bar, a temperature of 35° C. and a pH of 5.3). The nanofiltration membranes were Desal-5 DK, Desal-5 DL and NF 200.

The nanofiltration results are presented in Table I.

TABLE I

| DS in feed, % | Xylose in feed, % on DS | Xylose in permeate, % on DS |  |  |
|---|---|---|---|---|
| | | Desal-5DK | Desal-5 DL | NF 200 |
| 5.6 | 33.2 | 31 | 26 | 42 |
| 10.3 | 32.5 | 42 | 35 | 60 |
| 18.5 | 29.8 | 69 | 65 | 64 |

The contents of other carbohydrates (in addition to xylose), oligosaccharides, xylonic acid, metal cations ($Ca^{2+}$ and $Mg^{2+}$) as well as sulphite and sulphate ions were analyzed from samples taken from a concentration mode ultrafiltration (DS4) at three different concentrations (the feed samples) and from the corresponding permeates obtained from nanofiltration with three different nanofiltration membranes (the permeate samples).

The results are set forth in Table Ia. In Table Ia, sample numbers A, B and C refer to samples taken from the feed (liquor ultrafiltered with Desal G10 membrane) in a concentration mode filtration at three different dry substance contents (DS) of 5.6, 10.3 and 18.5, sample numbers D, E and F refer to corresponding samples taken from the permeate obtained from nanofiltration with a Desal 5DK membrane, sample numbers G, H and I refer to corresponding samples taken from the permeate obtained from nanofiltration with a Desal-5 DL membrane, and sample numbers J, K and L refer to the corresponding samples taken from the permeate obtained from nanofiltration with a NF 200 membrane.

Furthermore, Table Ib shows the carbohydrate contents and some other analytical results of the feed liquid at a dry substance content of 18.5% (sample C above) and of the corresponding permeate samples (samples F, I and L above) (ultrafiltration as the pretreatment step; the nanofiltering conditions: 35° C., 30 bar, pH 5.3, DS in the feed 18.5%, DSS LabStak® M20).

TABLE Ib

| | Feed | Permeate | | |
|---|---|---|---|---|
| | UF permeate (sample C) | Desal-5 DK (sample F) | Desal-5 DL (sample I) | NF-200 (sample L) |
| pH | 5.4 | 4.8 | 4.9 | 5.2 |
| Conductivity, mS/cm | 13.1 | 2.2 | 2.8 | 4.5 |
| Colour I | 99300 | 7050 | 12200 | 7540 |
| UV 280 nm, 1/cm | 350 | 17 | 16 | 18 |
| Xylose, % on DS | 29.8 | 69.0 | 65.0 | 64.0 |
| Glucose, % on DS | 3.9 | 2.8 | 1.9 | 3.9 |
| Xylonic acid, % on DS | 12.7 | 4.0 | 5 | 4.1 |
| $Mg^{2+}$, % on DS | 4.6 | 0.04 | 0.3 | 2.5 |
| $SO_4^{2-}$, % on DS | 3.8 | 0.1 | 0.5 | 0.4 |

Tables Ia and Ib show that nanofiltration effectively concentrated pentoses, such as xylose in the permeate, while removing an essential amount of disaccharides, xylonic acid, magnesium and sulphate ions from the xylose solution. Hexoses, such as glucose, galactose, rhamnose and mannose were not concentrated in the permeate.

The purity of xylose solutions can thus be effectively increased by nanofiltration. Furthermore, nanofiltration demineralizes the spent liquor by removing 98% of the divalent ions.

EXAMPLE 2

(A) Nanofiltration of Spent Liquor in Pilot Scale 340 kg of Mg-based sulphite spent pulping liquor was diluted with water to give 1600 l of a solution with DS of

TABLE Ia

| | A DS4. S1 | B DS4. S2 | C DS4. S3 | D DS4. DK1 | E DS4. DK2 | F DS4. DK3 | G DS4. DL1 | H DS4. DL2 | I DS4. DL3 | J DS4. NF1 | K DS4. NF2 | L DS4. NF3 |
|---|---|---|---|---|---|---|---|---|---|---|---|---|
| Carbohydrates, % on DS | | | | | | | | | | | | |
| glucose | 3.0 | 3.8 | 3.9 | 1 | 1.4 | 2.8 | 1 | 1 | 1.9 | 2 | 3 | 3.9 |
| xylose | 33.2 | 32.5 | 29.8 | 31 | 42 | 69 | 26 | 35 | 65 | 42 | 60 | 64.0 |
| galactose + rhamnose | 1.9 | 1.9 | 1.9 | 0.7 | 1.0 | 1.6 | 0.7 | 0.9 | 1.5 | 1 | 1.5 | 2.1 |
| arabinose | 0.3 | 0.3 | 0.3 | 0.3 | 0.3 | 0.6 | n.a. | 0.3 | 0.7 | 0.5 | 0.6 | 0.5 |
| mannose | 3.2 | 3.2 | 3.3 | 1 | 1.5 | 2.7 | 1 | 1.5 | 2.6 | 2 | 3 | 3.2 |
| Disaccharides, % on DS | 0.5 | 0.5 | 0.5 | n.d. | 0.2 | n.d. | n.d. | n.d. | 0.1 | n.d. | n.d. | n.d. |
| Xylonic acid, % on DS | 11.5 | 11.6 | 12.7 | 5 | 5 | 4 | 5 | 5 | 5 | 5 | 5 | 4.1 |
| Metals (ICP), % on DS | | | | | | | | | | | | |
| Ca | 0.12 | 0.11 | 0.11 | 0.7 | 0.4 | 0.1 | 0.7 | 0.5 | 0.1 | 0.4 | 0.3 | 0.1 |
| Mg | 2.1 | 4.0 | 4.6 | 0.5 | 0.4 | 0.04 | 0.9 | 0.9 | 0.3 | 2.1 | 2.6 | 2.5 |
| Sulphite (IC), % on DS | 0.51 | 0.62 | 0.59 | 0.4 | 0.3 | 0.5 | 0.5 | 0.4 | 0.6 | 0.3 | 0.6 | 0.9 |
| Sulphate (IC), % on DS | 2.9 | 3.2 | 3.8 | 0.2 | 0.2 | 0.1 | 1 | 0.8 | 0.5 | 0.6 | 0.5 | 0.4 | n.a. = not analyzed
n.d. = not detected

17%. The pH of the solution was adjusted with MgO from pH 2.6 to pH 5.4. The solution was filtered with Seitz filter using 4 kg of Arbocell® as filtering aid. Nanofiltration was carried using an equipment with Desal 5 DK3840 modules and an inlet pressure of 35 bar at 45° C. The nanofiltration permeate containing xylose was collected into a container until the flux of the permeate was reduced to a value below 10 l/m²/h. The collected permeate (780 l) was concentrated with an evaporator to 13.50 kg of a solution with DS of 64%. Table IIb presents the composition of the feed and the permeate. The contents of carbohydrates, acids and ions are expressed in % on DS.

TABLE IIb

|  | Feed | Permeate |
|---|---|---|
| pH | 5.0 | 5.2 |
| DS, g/100 g | 17.3 | 64.5 |
| Oligosaccharides, % on DS | 0.6 | 0.02 |
| Xylose | 12.5 | 64.8 |
| Glucose | 1.9 | 3.2 |
| Galactose + rhamnose | 1.2 | 2.3 |
| Arabinose + mannose | 1.3 | 3.0 |
| Xylonic acid | 3.7 | 3.2 |
| Xylobiose | 0.1 | 0.0 |
| Acetic acid | 1.4 | 3.7 |
| $Na^+$ | 0.0 | 0.1 |
| $K^+$ | 0.2 | 3.1 |
| $Ca^{2+}$ | 0.1 | 0.0 |
| $Mg^{2+}$ | 2.7 | 0.5 |
| $SO_3^-$ | <0.5 | 0.5 |
| $SO_4^{2-}$ | 2.1 | 0.6 |

(B) Crystallization of Xylose

Combined nanofiltration permeate liquids of Mg sulphite cooking liquor (230 liters, DS 49%), obtained by the above-mentioned method, were used for xylose crystallisation test. Part of the liquid was pulled into an 400-liter evaporation crystallizer and evaporated at about 65° C. with the feed intake. At DS 83% the mass was seeded with 15 g of powdered, crystalline xylose (the mass volume was about 110 liters). Evaporation at about 65° C. (with the feed liquid intake) was continued until the feed liquor finished. During the evaporation the mass was slowly concentrated to the final DS of 87%. The total time from the start of the evaporation to the end of evaporation was 4.5 hours.

Part of the crystallisation mass was dropped into a 10-liter cooling crystalliser (65° C.). Linear cooling program from 65° C. to 35° C. in 18 hours was started. In the final temperature (35° C.) the xylose crystals were separated by centrifugation (with Hettich Roto Silenta II centrifuge; basket diameter 23 cm; screen openings 0.15 mm) at 3500 rpm for 5 minutes. The crystal cake was washed by spraying with 80 ml of water.

Good yields were obtained by the centrifugation: the DS/DS yield and xylose from xylose yield was 36% and 55%, respectively. Xylose purity of the crystal cake was 97.6% on DS and the crystal colour was 310. (The corresponding values of the final crystallisation mass were 63.3% on DS and 48400, respectively.)

Table IIc presents the weight of the crystal mass introduced into the centrifuge and the weight of the crystal cake after the centrifugation. The table also gives the DS and the xylose purity of the final crystallization mass, the crystal cake as well as the run-off fraction. Table IId gives some more analysis results of the above-mentioned samples.

TABLE IIc

| Mass into centrifuge (g) | 929 |
|---|---|
| Washing (ml) | 80 |
| Washing (% on DS of cake) | 28 |
| Cake (g) | 288 |
| Thickness of cake (cm) | 0.8 |
| Mass DS (w-%) | 85.1 |
| Mass purity (% on DS) | 63.3 |
| Cake DS (w-%) | 98.7 |
| Cake purity (% on DS) | 97.6 |
| Run-off purity (% on DS) | 43.1 |
| Yield DS/DS (%) | 36 |
| Yield Xylose/Xylose (%) | 55 |

TABLE IId

|  | Final crystallisation mass | Cake, 90 ml wash | Run-off, 80 ml wash |
|---|---|---|---|
| DS (w-%) | 85.1 | 98.7 | 72.8 |
| pH at DS 40-50% | 6.6 | 5.7 | 6.6 |
| Colour at pH 5 | 48400 | 310 | 74300 |
| Conductivity at DS 10% (mS/cm) | 6.44 | 0.05 | 9.29 |
| Glucose (% on DS) | 3.9 | 0.5 | 5.8 |
| Xylose (% on DS) | 63.3 | 97.6 | 43.1 |
| Galactose + rhamnose (% on DS) | 3.3 | 0.0 | 4.6 |
| Arabinose + mannose (% on DS) | 4.2 | 0.0 | 7.0 |
| Oligosaccharides (% on DS) | 0.1 | 0.0 | 0.1 |

EXAMPLE 3

Nanofiltration of a Xylose Fraction Obtained from Chromatographic Separation, Followed by Crystallization of the Xylose-containing Nanofiltration Permeate (A) Chromatographic Separation Sulphite cooking liquor from a $Mg^{2+}$ based cooking process was subjected to a chromatographic separation process with the aim to separate xylose therefrom.

The equipment used for the chromatographic separation included four columns connected in series, a feed pump, circulation pumps, an eluent water pump as well as inlet and product valves for the various process streams. The height of each column was 2.9 m and each column had a diameter of 0.2 m. The columns were packed with a strong acid gel type ion exchange resin (Finex CS13GC) in $Mg^{2+}$ form. The average bead size was 0.36 mm and the divinylbenzene content was 6.5%.

The sulphite cooking liquor was filtered using diatomaceous earth and diluted to a concentration of 48% by weight. The pH of the liquor was 3.3. The sulphite cooking liquor was composed as set forth in Table IIIa below.

TABLE IIIa

| Composition of the feed | % on DS |
|---|---|
| Xylose | 13.9 |
| Glucose | 1.9 |
| Galactose + rhamnose | 1.4 |
| Arabinose + mannose | 1.9 |
| Xylonic acid | 4.5 |
| Others | 76.4 |

The chromatographic fractionation was carried out using a 7-step SMB sequence as set forth below. The feed and the eluent were used at a temperature of 70° C. Water was used as the eluent.

Step 1: 9 l of feed solution were pumped into the first column at a flow rate of 120 l/h, firstly 4 l of the recycle fraction and then 5 l of the xylose fraction were collected from column 4.

Step 2: 23.5 l of the feed solution were pumped into the first column at a flow rate of 120 l/h and a residual fraction was collected from the same column. Simultaneously 20 l of water were pumped into the second column at a flow rate of 102 l/h and a residual fraction was collected from column 3. Simultaneously also 12 l of water were pumped into column 4 at a flow rate of 60 l/h and a xylose fraction was collected from the same column.

Step 3: 4 l of feed solution were pumped into the first column at a flow rate of 120 l/h and a residual fraction was collected from column 3. Simultaneously 5.5 l of water were pumped into column 4 at a flow rate of 165 l/h and a recycle fraction was collected from the same column.

Step 4: 28 l were circulated in the column set loop, formed with all columns, at a flow rate of 130 l/h.

Step 5: 4 l of water were pumped into column 3 at a flow rate of 130 l/h and a residual fraction was collected from the second column.

Step 6: 20.5 l of water were pumped into the first column at a flow rate of 130 l/h and a residual fraction was collected from column 2. Simultaneously 24 of water were pumped into column 3 at a flow rate of 152 l/h and a residual fraction was collected from column 4.

Step 7: 23 l were circulated in the column set loop, formed with all columns, at a flow rate of 135 l/h.

After the system had reached equilibrium, the following fractions were drawn from the system: residual fractions from all columns, a xylose containing fraction from column 4 and two recycle fractions from column 4. Results including HPLC analyses for the combined fractions are set forth below. The contents of carbohydrates are expressed as % on DS.

TABLE IIIb

| Fraction | Xylose | Residual | Recycle |
|---|---|---|---|
| Volume, l | 17 | 96 | 9.5 |
| DS, g/100 ml | 23.8 | 16.4 | 21.7 |
| Xylose | 50.4 | 1.2 | 45.7 |
| Glucose | 4.8 | 0.9 | 4.2 |
| Galactose + rhamnose | 4.7 | 0.2 | 4.4 |
| Arabinose + mannose | 5.9 | 0.4 | 5.8 |
| Xylonic acid | 6.9 | 3.5 | 7.8 |
| Others | 27.3 | 93.8 | 32.1 |
| PH | 3.7 | 3.6 | 3.9 |

The overall xylose yield calculated from these fractions was 91.4%.

(B) Nanofiltration of the Xylose Fraction 325 kg of the xylose fraction obtained from the chromatographic separation above was diluted with water to give 2000 l of a solution with DS of 14%. The pH of the solution was raised with MgO from pH 3.7 to 4.9 and the solution was heated to 45° C. The heated solution was filtered with Seitz filter using 4 kg of Arbocell® as filtering aid. The clear solution was nanofiltered with Desal 5 DK3840 modules, using an inlet pressure of 35 bar at 45° C. During nanofiltration the permeate was collected into a container and the concentration was continued until the permeate flux decreased to a value below 10 l/m$^2$/h. The collected permeate (750 l) was concentrated with an evaporator to 18.5 kg of a solution with DS of 67%. Table IIIc presents the composition of the feed and the evaporated permeate. The contents of carbohydrates, acids and ions are expressed in % on DS.

TABLE IIIc

|  | Feed | Permeate |
|---|---|---|
| pH | 4.9 | 4.6 |
| DS, g/100 g | 13.5 | 67.7 |
| Oligosaccharides, % on DS | 0.5 | 0.0 |
| Xylose | 50.4 | 76.0 |
| Glucose | 4.1 | 2.0 |
| Galactose + rhamnose | 4.7 | 2.5 |
| Arabinose + mannose | 5.9 | 3.9 |
| Xylobiose | 0.04 | 0.02 |
| Xylonic acid | 6.9 | 3.6 |
| Acetic acid | 1.6 | 0.6 |
| Na$^+$ | 0.0 | 0.0 |
| K$^+$ | 0.1 | 0.6 |
| Ca$^{2+}$ | 0.1 | 0.0 |
| Mg$^{2+}$ | 2.0 | 0.2 |
| SO$_4^{2-}$ | 2.3 | 0.1 |

(C) Crystallization of the Xylose-containing Nanofiltration Permeate

The nanofiltration permeate obtained above was subjected to crystallization to crystallize the xylose contained therein. 18.5 kg of the permeate obtained in step (B) (about 11 kg DS) was evaporated with rotavapor (Büchi Rotavapor R-153) to DS of 82%. The temperature of the rotavapor bath was 70 to 75° C. during the evaporation. 12.6 kg of the evaporated mass (10.3 kg DS) was put into a 10-liter cooling crystallizer. The jacket temperature of the crystallizer was 65° C. A linear cooling program was started: from 65° C. to 35° C. in 15 hours. Thereafter the cooling program was continued from 34° C. to 30° C. in 2 hours, because of the thin mass. In the final temperature (30° C.) the xylose crystals were separated by centrifugation (with Hettich Roto Silenta II centrifuge; basket diameter 23 cm; screen openings 0.15 mm) at 3500 rpm for 5 minutes. The crystal cake was washed by spraying with 80 ml water.

High quality crystals were obtained in the centrifugation. The cake had high DS (100%), high xylose purity (99.8% on DS) and low colour (64). The centrifugation yield was 42% (DS from DS) and 54% (xylose from xylose).

Part of the crystal cake was dried in an oven at 55° C. for 2 hours. The average crystal size was determined by sieve analysis to be 0.47 mm (CV % 38).

Table IIId presents the weight of the crystal mass introduced into the centrifuge and the weight of the crystal cake after the centrifugation. The table also gives the DS and the xylose purity of the final crystallization mass, the crystal cake as well as the run-off fraction.

Furthermore, Table IIIe also presents the corresponding values for glucose, galactose, rhamnose, arabinose, mannose and oligosaccharides.

TABLE IIId

| Centrifugation Tests | Mass into centrifuge g | Washing ml | Washing % on $DS_{cake}$ | Cake g | Thickness of cake cm | Mass DS w-% | Mass purity % on DS | Cake DS w-% | Cake purity % on DS | Run-off purity % on DS | Yields DS/DS | xylose/xylose % |
|---|---|---|---|---|---|---|---|---|---|---|---|---|
| Centrifugation | 922 | 80 | 26 | 313 | 1.0 | 81.8 | 76.8 | 100.0 | 99.8 | 60.6 | 42 | 54 |

TABLE IIIe

| Sample name | pH DS w-% | pH (of 30-50 w-% solution) | Colour | Carbohydrates Glucose % on DS | Xylose % on DS | Gal + Ram % on DS | Arab. + mannose % on DS | Na+ column Oligosaccharides % on DS |
|---|---|---|---|---|---|---|---|---|
| Start of cooling | 81.5 | 4.0 | 7590 | 2.2 | 77.8 | 3.0 | 4.2 | 0.0 |
| Cake, 80 ml wash | 100.2 | 4.3 | 64 | 0.3 | 99.8 | 0.0 | 0.0 | 0.0 |
| Run-off, 80 ml wash | 64.8 | 4.1 | 15100 | 3.6 | 60.6 | 4.6 | 7.3 | 0.0 |

EXAMPLE 4

(A) Nanofiltration of a Mother Liquor Obtained from the Crystallization of Xylose 300 kg of mother liquor from the precipitation crystallization of xylose was diluted with water to give 2500 l of a solution with DS of 16%. The pH of the solution was raised with MgO to pH 4.2 and the solution was heated to 45° C. The heated solution was filtered with Seitz filter using 4 kg of Arbocell® as filtering aid. The clear solution was nanofiltered with Desal 5 DK3840 modules, using an inlet pressure of 35 bar at 45° C. During nanofiltration the permeate was collected into a container and the concentration was continued until the permeate flux was decreased to a value below 10 l/m²/h. The collected permeate (630 l) was concentrated with an evaporator to 19.9 kg of a solution with DS of 60%. Table IVa presents the composition of the feed and the evaporated permeate. The contents of the components (carbohydrates and ions) are expressed in % on DS.

TABLE IVa

| | Feed | Permeate |
|---|---|---|
| pH | 4.2 | 3.5 |
| DS, g/100 g | 16.3 | 63.4 |
| Oligosaccharides, % on DS | 2.9 | 0.9 |
| Xylose | 20.5 | 48.3 |
| Glucose | 5.8 | 3.8 |
| Galactose + rhamnose | 5.0 | 3.8 |
| Arabinose + mannose | 6.8 | 6.1 |
| Xylonic acid | 13.6 | 14.0 |
| $Na^+$ | 0.0 | 0.0 |
| $K^+$ | 0.2 | 1.3 |
| $Ca^{2+}$ | 0.1 | 0.0 |
| $Mg^{2+}$ | 3.0 | 0.2 |
| $SO_3^-$ | <0.1 | 0.3 |
| $SO_4^{2-}$ | 3.6 | 0.3 |

(B) Crystallization of Xylose

About 8 kg DS of the nanofiltration permeate of crystallisation mother liquor, obtained above, was evaporated with rotavapor (Büchi Rotavapor R-153) to DS of 93%. The temperature of the rotavapor bath was about 75° C. during the evaporation. The evaporated mass was put into a 6-liter cooling crystallizer. The jacket temperature of the crystallizer was 65° C. The mass was seeded with 3 g of powdered, crystalline xylose. A linear cooling program was started: from 65° C. to 25° C. in 40 hours. In the final temperature (25° C.) the mass viscosity was 331000 cP. The mass was diluted with water (4.8 vol-%) to make the separation of the crystals easier. After homogenizing the mass for about 2 hours the mass viscosity was 32000 cP. The xylose crystals were separated with pressure filter (Larox PF 0.1H2 with filter textile Tamfelt 2209 L1). The filtration area was 0.1 m². Part of the crystallisation mass was introduced onto the filter textile and then pressed at 16 bar for 40 min. After that the air drying cycle was put on for 2 minutes, at a pressure of 7 bar. Finally the crystal cake (thickness about 2 cm) was detached from the filter textile and a representative sample for the analysis was taken. Also the mother liquor collected during the pressure filtration was analysed.

Table IVb gives the analysis results of the crystallisation samples in the end of cooling, after dilution for the separation of the crystals and of the crystal cake and the mother liquid. The results indicate that a cake with good purity was obtained (for recrystallisation of xylose). The yields calculated from the mass, cake and mother liquid purities and the mass DS are 42% on DS/DS and 69% on xylose from xylose.

TABLE IVb

| | Mass at the end of cooling | Mass for filtration | Larox cake | Larox mother liquid |
|---|---|---|---|---|
| DS (w-%) | 92.8 | 89.8 | 95.9 | 81.6 |
| pH at DS 39-49% | 3.6 | 3.5 | 3.5 | 3.5 |
| Conductivity at DS 10% (mS/cm) | 3.32 | 3.23 | 1.58 | 4.49 |
| Colour at pH 5 | 22 600 | 22 300 | 9 440 | 31 800 |

TABLE IVb-continued

|  | Mass at the end of cooling | Mass for filtration | Larox cake | Larox mother liquid |
|---|---|---|---|---|
| Glucose (% on DS) | 3.7 | 3.7 | 2.1 | 5.0 |
| Xylose (% on DS) | 47.3 | 46.4 | 76.0 | 24.6 |
| Galactose + rhamnose (% on DS) | 4.1 | 4.2 | 1.5 | 6.0 |
| Arabinose. + Mannose (% on DS) | 6.1 | 6.6 | 2.7 | 8.9 |
| Oligosaccharides (% on DS) | 0.8 | 0.6 | 0.3 | 1.5 |

EXAMPLE 5

(A) Pilot Scale Nanofiltration of Fructose Run-off from $3^{rd}$ Crystallization of Fructose to Remove Crystallization Inhibitors 1200 kg of run-off obtained from third crystallization of fructose was diluted with ion free water to obtain 1500 liters of a solution having DS of 48%. The solution was prefiltered with Gaf bag filter. Nanofiltration was carried out with Desal-5 DL spiral wound module, using an inlet pressure of 40 bar at 60° C. The nanofiltration was carried out in constance dry substance level, and minimized amount of diawater was fed into the reactor. The fructose-containing permeate was collected into a container until there was 3% of the solution left.

TABLE Va

Compositions of the feed and permeate in the nanofiltration of fructose

|  | Feed | Permeate |
|---|---|---|
| pH | 4.6 | 4.4 |
| DS, % (g/100 g) | 50.2 | 62.6 |
| Colour, ICUMSA | 1145 | 220 |
| Glucose, % on DS | 3.5 | 3.7 |
| Fructose, % on DS | 87.8 | 92.8 |
| Oligosaccharides, % on DS | 3.0 | 0.8 |
| Na, mg/kg DS | 239 | 228 |
| K, mg/kg DS | 22 | 20 |
| Ca, mg/kg DS | 76 | 6.9 |
| Mg, mg/kg DS | 4.6 | <2 |
| SO$_4$ | 71 | 14 |

(B) Crystallization of Fructose

The nanofiltration permeate obtained above was subjected to crystallization to crystallize the fructose contained therein. About 25 liters of the permeate liquid (RDS 46.6%) was evaporated with rotavapor (Büchi Rotavapor R-153) to RDS of 92.4%. The temperature of the rotavapor bath was about 65° C. during the evaporation. 8.9 kg of the evaporated mass (8,2 kg DS) was put into a 6-liter cooling crystallizer. The jacket temperature of the crystallizer was 58° C. and the mass temperature 56.5° C. The mass was seeded with 0.45 g of powdered, crystalline fructose. A linear cooling program was started: from 57° C. to 52° C. in 16 hours. Thereafter the cooling program was continued from 52° C. to 30° C. in 7 hours. In the final temperature (30° C.) the mass was too thick for centrifugation, and therefore it was warmed to 40° C. Fructose crystals were separated by centrifugation (with Hettich Roto Silenta II centrifuge; basket diameter 23 cm; screen openings 0.15 mm) at 3000 rpm for 3 minutes. The crystal cake was washed by spraying with 20 ml water.

Good yields were obtained by centrifugation (the DS/DS and fructose from fructose yields were 51% and 56%, respectively). Fructose purity of the crystal cake was 100.0% on RDS and the crystal colour was 49.

Table Va presents the weight of the crystal mass introduced into the centrifuge and the weight of the crystal cake after the centrifugation. The table also gives the RDS and the fructose purity of the final crystallization mass, the crystal cake as well as the run-off fraction. Table Vb gives some more analysis results of the above-mentioned samples.

TABLE Va

| Mass into centrifuge (g) | 901 |
|---|---|
| Washing (ml) | 20 |
| Washing (% on DS of cake) | 5 |
| Cake (g) | 442 |
| Thickness of cake (cm) | 0.7 |
| Mass RDS (w-%) | 92.5 |
| Mass purity (% on RDS) | 92.3 |
| Cake DS (w-%) | 95.4 |
| Cake purity (% on RDS) | 100.0 |
| Run-off purity (% on RDS) | 87.8 |
| Yield DS/DS (%) | 51 |
| Yield Fructose/Fructose (%) | 56 |

TABLE Vb

|  | Evaporated mass | Cake, 20 ml wash | Run-off, 20 ml wash |
|---|---|---|---|
| RDS (w-%) | 92.4 | 95.4 | 85.0 |
| pH at RDS 44-58% | 4.5 | 4.6 | 4.5 |
| Colour | 130 | 49 | 500 |
| Conductivity at RDS 10% (µS/cm) | 190 | 40 | 334 |
| Glucose (% on RDS) | 3.6 | 0.6 | 6.8 |
| Fructose (% on RDS) | 93.3 | 100.0 | 87.8 |
| Psicose (% on RDS) | 0.5 | 0.0 | 1.4 |
| Oligosaccharides (% on RDS) | 0.2 | 0.0 | 0.4 |

EXAMPLE 6

Nanofiltration of a Maltose Solution to Remove Crystallization Inhibitors

The liquor to be treated was a maltose syrup having a maltose content of about 84% on RDS or about 7.6-7.8% on liquid weight, a maltotriose content of about 8.5 to 8.8 on RDS or about 0.8% on liquid weight and a dry substance content of about 9.2% by weight.

A batch mode nanofiltration with nine different nanofiltration membranes was carried out using a laboratory nanofiltration equipment consisting of rectangular cross-flow flat sheet modules with a membrane area of 0.0046 m$^2$. The nanofiltration equipment contained three nanofiltration elements in parallel, whereby three different membranes could be tested at the same time with the same feed. The feed volume in all tests was 20 liters. Before the nanofiltration, the membranes were washed with water.

The nanofiltration temperature was about 35° C. in the first three filtrations (tests 1 to 14), pH was between 6 and 7. In the fourth filtration (tests 15 to 19), pH was 4.5.

In the first filtration (tests 1 to 6), the pressure was gradually increased from 8 bar to 18 bar. The subsequent filtrations (tests 7 to 19) were made at a pressure of 18 bar. All tests were carried out with a cross-flow velocity of 6 m/s.

The contents of carbohydrates (maltotriose, maltose and glucose) on liquid weight (% of lw) and/or on RDS (% of RDS) were analyzed from the feed liquid before the nanofiltration, from the permeate obtained from the nanofiltration with nine different nanofiltration membranes and from the feed liquid after the nanofiltration (the retentate obtained from the nanofiltration). Furthermore, the contents of metal ions (Na, Ca) (mg/kg RDS) as well as the ratio of maltose to maltotriose were measured from the same samples. The results of the nanofiltration tests are set forth in Tables I and II.

The results of Tables VI and VII show that the tested membranes retained a higher proportion of maltotriose than maltose, resulting in a clear increase in the ratio of maltose to maltotriose in the permeate. The best results are obtained with NTR-7450 and Desal G10 membranes. For instance, with Desal G10 membrane, the ratio of maltose to maltotriose in the permeate is about 28-fold compared to the corresponding ratio in the feed before the nanofiltration. The results also show that oligosaccharides are almost completely retained by the nanofiltration membranes.

As a conclusion, maltotriose can thus be effectively separated from maltose using nanofiltration.

TABLE VI

| | 1 MA1-S1 | 2 MA1-B1 | 3 MA1-C1 | 4 MA1-S2 | 5 MA1-B2 | 6 MA1-C2 | 7 MA2-S2 | 8 MA2-PB | 9 MA2-PC | 10 MA2-S3 |
|---|---|---|---|---|---|---|---|---|---|---|
| Carbohydrates (HPLC with Na$^+$ form ion exchange column): | | | | | | | | | | |
| maltotriose (% of RDS) | 8.5 | 0.8 | 0.6 | 8.4 | 0.2 | 0.3 | 8.5 | 5.8 | 4.3 | 8.5 |
| maltose (% of lw) | 7.62 | 0.30 | 1.53 | 7.80 | 0.21 | 1.14 | 7.67 | 0.27 | 2.88 | 7.88 |
| maltose (% of RDS) | 84.1 | 57 | 73.5 | 83.7 | 56 | 74.2 | 84.0 | 70 | 79.8 | 83.5 |
| glucose (% of RDS) | 6.2 | 37 | 17.2 | 6.2 | 36 | 20.2 | 6.2 | 14 | 10.0 | 6.1 |
| Ratio maltose/maltotriose | 10 | 69 | 132 | 10 | 250 | 283 | 10 | 12 | 18 | 10 |
| Increase in the ratio maltose/maltotriose (x-fold) | | 6.9 | 13.2 | | 25.0 | 28.3 | | 1.2 | 1.8 | |
| Metals (ICP) mg/kg RDS: | | | | | | | | | | |
| Na | 220 | 1610 | 580 | 215 | 1610 | 650 | 210 | 1840 | 300 | 210 |
| Ca | 110 | <190 | 100 | 110 | <259 | 90 | 110 | <259 | 60 | 130 |

1 MA1-S1 feed liquid
2 MA1-B1 Permeate 14 bar NTR-7450
3 MA1-C1 Permeate 14 bar Desal G10
4 MA1-S2 feed liquid
5 MA1-B2 Permeate for 18 bar NTR-7450
6 MA1-C2 Permeate for 18 bar Desal G10
7 MA2-S2 feed liquor at start
8 MA2-PB Permeate for 18 bar NF200
9 MA2-PC Permeate for 18 bar ASP 10
10 MA2-S3 feed liquor in the end

TABLE VII

| | 11 MA3-S2 | 12 MA3-PA | 13 MA3-PB | 14 MA3-S3 | 15 MA4-S2 | 16 MA4-PA | 17 MA4-PB | 18 MA4-PC | 19 MA4-S3 |
|---|---|---|---|---|---|---|---|---|---|
| Carbohydrates (HPLC with Na$^+$ form ion exchange column): | | | | | | | | | |
| maltotriose (% of RDS) | 8.6 | 5.5 | 4.0 | 8.9 | 8.8 | 5.5 | 4.2 | 5.0 | 8.9 |
| maltose (% of lw) | 7.72 | 2.30 | 2.13 | 7.91 | 7.70 | 5.85 | 3.06 | 1.70 | 7.85 |
| maltose (% of RDS) | 84.0 | 83.8 | 79.5 | 84.9 | 84.4 | 85.8 | 87.3 | 81.7 | 84.8 |
| glucose (% of RDS) | 6.1 | 8.7 | 12.1 | 6.1 | 6.1 | 7.5 | 9.6 | 8.3 | 6.1 |
| Ratio maltose/maltotriose | 10 | 15 | 20 | 10 | 10 | 16 | 21 | 16 | 10 |
| Increase in the ratio maltose/maltotriose (x-fold) | | 1.5 | 2.0 | | | 1.6 | 2.1 | 1.6 | |
| Metals (ICP) mg/kg RDS: | | | | | | | | | |
| Na | 210 | 470 | 410 | 215 | 210 | 220 | 330 | 430 | 240 |
| Ca | 120 | 135 | 40 | 130 | 80 | 90 | 130 | 100 | 120 |

11 MA3-S2 feed liquor at start
12 MA3-PA Permeate 18 bar TS 40
13 MA3-PB Permeate 18 bar ASP 20
14 MA3-S3 feed liquor in the end
15 MA4-S2 feed liquor at start
16 MA4-PA Permeate 18 bar UF-PES-4H
17 MA4-PB Permeate 18 bar NF-PES-10
18 MA4-PC Permeate 18 bar NF45
19 MA4-S3 feed liquor in the end

EXAMPLE 7

In this example, the liquor to be nanofiltered is an enzymatically saccharified maltose syrup containing over 70% maltose. The saccharification had been carried out with a combination of a pullulanase enzyme (Promozyme® 600 L, manufacturer Novo Nordisk A/S) in an amount of 1 l/t DS and a βamylase enzyme (β-amylase 1500° Lintner, manufacturer Novo Nordisk A/S) in an amount of 1 kg/t DS at a temperature of 58° C. and at a pH of 5.5 for two days. The contents of maltose, maltotriose and glucose in the saccharified product appear from Table VIII (feed, % on DS).

The saccharified maltose syrup thus obtained is subjected to nanofiltration using a Desal G10 membrane at a pressure of 18 bar. The dry substance content of the feed is 10%. The nanofiltration is carried out using the same equipment as in Example 1.

Table VIII shows the contents of maltotriose, maltose, glucose and polysaccharides with a polymerization degree higher than three (>DP3) of the feed and permeate obtained from the nanofiltration, calculated from the dry substance (DS) of the feed and permeate.

TABLE VIII

| Compound | Feed, % on DS | Permeate, % on DS |
|---|---|---|
| Maltotriose | 13.0 | 0.6 |
| Maltose | 72.0 | 95.5 |
| Glucose | 0.5 | 2.4 |
| >DP3 | 14.5 | 1.5 |

The foregoing general discussion and experimental examples are only intended to be illustrative of the present invention, and not to be considered as limiting. Other variations within the spirit and scope of this invention are possible and will present themselves to those skilled in the art.

The invention claimed is:

1. A process of removing crystallization inhibitors from a solution comprising at least one reducing monosaccharide sugar selected from xylose, fructose and corresponding sugar alcohol of said reducing monosaccharide sugar, followed by crystallization of said xylose or fructose or corresponding sugar alcohol, comprising
   subjecting said solution to one or more purification steps selected from nanofiltration and optionally hydrolysis and chromatography, whereby said xylose or fructose or corresponding sugar alcohol thereof is recovered in the nanofiltration permeate and said crystallization inhibitors are recovered in the nanofiltration retentate, and
   subjecting said nanofiltration permeate containing said xylose or fructose or corresponding sugar alcohol thereof to a crystallization process selected from boiling crystallization, cooling crystallization, precipitation crystallization and combinations thereof, to produce crystals of said xylose or fructose or corresponding sugar alcohol thereof, and
   collecting the crystals by centrifugation and filtering.

2. A process as claimed in claim 1, wherein said crystallization inhibitor is selected from compounds which have a larger molar mass than said xylose or fructose or the corresponding sugar alcohol thereof.

3. A process as claimed in claim 2, wherein said crystallization inhibitor is selected from compounds which in their molecule include at least one monosaccharide or corresponding unit more than said xylose or fructose or the corresponding sugar alcohol thereof.

4. A process as claimed in claim 2, wherein said crystallization inhibitor is selected from dimeric and/or oligomeric compounds.

5. A process as claimed in claim 4, wherein said dimeric and/or oligomeric compounds are selected from dimeric and/or oligomeric forms of said xylose or fructose or the corresponding sugar alcohol thereof.

6. A process as claimed in claim 1, wherein said crystallization inhibitor is selected from xylobiose, xylotriose and xylo-oligosaccharides.

7. A process as claimed in claim 1, wherein said crystallization inhibitor is selected from difructose anhydrides, fructose dianhydrides, diheterolevosanes and diheterolevulosans.

8. A process as claimed in claim 1, wherein the nanofiltration is carried out at a pressure of 10 to 50 bar.

9. A process as claimed in claim 8, wherein the nanofiltration is carried out at a pressure of 15 to 40 bar.

10. A process as claimed in claim 1, wherein the nanofiltration is carried out at a temperature of 5 to 95° C.

11. A process as claimed in claim 10, wherein the nanofiltration is carried out at a temperature of 30 to 60° C.

12. A process as claimed in claim 1, wherein the nanofiltration is carried out with a flux of 5 to 100 liters/$m^2h$.

13. A process as claimed in claim 1, wherein the nanofiltration is carried out using a nanofiltration membrane selected from polymeric and inorganic membranes having a cut-off size of 100 to 2500 g/mol.

14. A process as claimed in claim 13, wherein the cut-off size of the nanofiltration membrane is 150 to 1000 g/mol.

15. A process as claimed in claim 14, wherein the cut-off size of the nanofiltration membrane is 150 to 500 g/mol.

16. A process as claimed in claim 13, wherein the nanofiltration membrane is selected from ionic membranes.

17. A process as claimed in claim 13, wherein the nanofiltration membrane is selected from hydrophobic and hydrophilic membranes.

18. A process as claimed in claim 13, wherein the nanofiltration membrane is selected from cellulose acetate membranes, polyethersulfone membranes, sulfonated polyether sulphone membranes, polyester membranes, polysulfone membranes, aromatic polyamide membranes, polyvinyl alcohol membranes and polypiperazine membranes and combinations thereof.

19. A process as claimed in claim 18, wherein the nanofiltration membrane is selected from sulfonated polyether sulfone membranes and polypiperazine membranes.

20. A process as claimed in claim 18, wherein the nanofiltration membrane is selected from
   a polypiperazine membrane having a cut-off size of 200 g/mol, permeability (25° C.) of 7 to 8l/($m^2h$ bar) and NaCl-retention of 70%,
   a four-layered membrane comprising a polyester layer and a polysulfone layer, said membrane having a cut-off size of 150 to 300 g/mol, permeability (25° C.) of 7.6 l/$m^2h$ bar) and $MgSO_4$-retention of 96% (2 g/l),
   a four-layered membrane comprising a polyester layer and a polysulfone layer, said membrane having a cut-off size of 150 to 300 g/mol, permeability (25° C.) of 5.4 l/($m^2h$ bar) and $MgSO_4$-retention of 98% (2 g/l),
   a thin film membrane of aromatic polyamide/polysulfone material having a cut-off size of 2500 g/mol, permeability (25° C.) of 3.4l/($m^2h$ bar), NaCl-retention of 10%, retention of dextrane (1500 g/ml) of 95% and retention of glucose of 50%, and a sulfonated polyethersulfone membrane having a cut-off size of 500 to 1000 g/mol, permeability (25° C.) of 9.4 l/(m²h bar) and NaCl-retention of 51% (51 g/l).

21. A process as claimed in claim 13, wherein the form of the nanofiltration membrane is selected from sheets, tubes, spiral membranes and hollow fibers.

22. A process as claimed in claim 1, wherein the nanofiltration process is repeated at least once.

23. A process as claimed in claim 1, wherein said purification steps further comprise hydrolysis.

24. A process as claimed in claim 23, wherein said hydrolysis comprises enzymatic hydrolysis.

25. A process as claimed in claim 23, wherein said hydrolysis comprises acid hydrolysis.

26. A process as claimed in claim 1, wherein said purification steps further comprise chromatographic separation.

27. A process as claimed in claim 26, wherein said chromatographic separation is carried out using a column packing material selected from cation exchange resins and anion exchange resins.

28. A process as claimed in claim 27 wherein said cation exchange resins are selected from strongly acid cation exchange resins and weakly acid cation exchange resins.

29. A process as claimed in claim 27, wherein said resin is in a monovalent metal form or a divalent metal form.

30. A process as claimed in claim 27, wherein the resin has a styrene skeleton or acrylic skeleton.

31. A process as claimed in claim 1, wherein said solution comprising one or more reducing sugars selected from xylose, fructose or corresponding sugar alcohols thereof is a biomass hydrolysate.

32. A process as claimed in claim 1, wherein said solution comprising one or more reducing sugars selected from xylose, fructose or corresponding sugar alcohols thereof is a fraction enriched in said xylose or fructose or sugar alcohol thereof and obtained from the separation of said xylose or fructose or sugar alcohol.

33. A process as claimed in claim 32, wherein said solution comprising one or more reducing sugars selected from xylose, fructose or sugar alcohols thereof is obtained from the chromatographic separation of said xylose or fructose or sugar alcohol thereof.

34. A process as claimed in claim 1, wherein said solution comprising at least one reducing monosaccharide sugar or corresponding sugar alcohols thereof is a mother liquor obtained from the crystallization of said reducing sugar or sugar alcohol.

35. A process as claimed in claim 1, wherein said solution comprising xylose is a spent liquor obtained from a pulping process.

36. A process as claimed in claim 1, wherein said solution comprising xylose is a xylose fraction obtained from the chromatographic separation of xylose from a spent liquor obtained from a pulping process.

37. A process as claimed in claim 1, wherein said solution comprising xylose is a mother liquor obtained from the crystallization of xylose.

38. A process as claimed in claim 1, wherein said solution comprising fructose is a fructose solution obtained from the hydrolysis of starch.

39. A process as claimed in claim 1, wherein said solution comprising fructose is a fructose solution obtained from hydrolyzed and isomerized saccharose.

40. A process as claimed in claim 1, wherein said solution comprising fructose is a fructose fraction obtained from the separation of fructose from a fructose solution, wherein said fructose solution is obtained from the hydrolysis of starch and/or isomerisation of saccharose.

41. A process as claimed in claim 40, wherein said solution comprising fructose is a fructose fraction obtained from the chromatographic separation of fructose from a solution, wherein said fructose solution is obtained from the hydrolysis of starch and/or isomerisation of saccharose.

42. A process as claimed in claim 1, wherein said solution comprising fructose is a mother liquor obtained from the crystallization of fructose.

* * * * *